UNITED STATES PATENT OFFICE.

ORAZIO LUGO AND HUSON T. JACKSON, OF NEW YORK, N. Y.

PRODUCTION OF ALCOHOLIC LIQUORS.

SPECIFICATION forming part of Letters Patent No. 534,400, dated February 19, 1895.

Application filed June 6, 1894. Serial No. 513,644. (No specimens.)

*To all whom it may concern:*

Be it known that we, ORAZIO LUGO and HUSON T. JACKSON, citizens of the United States, and residents of the city, county, and State of New York, have invented a new and useful Improvement in the Production of Alcoholic Liquors, of which the following is a specification.

This invention relates to processes for freeing alcoholic beverages from deleterious substances.

The object of our invention is to produce alcoholic beverages having all the qualities of old liquors, in a short time, and at small cost.

The first part of our invention consists in the treatment of the distillates of the vinous fermentations, such as whisky or brandy, with a current of electricity passed through the whisky or brandy by means of electrodes of metallic aluminum.

The second part of our invention consists in the treatment of wines before the distillation of their alcoholic contents, with a current of electricity, the electrodes forming part of the electric circuit being of aluminum, for the purpose hereinafter specified.

The third part of our invention consists in the use of certain kinds of wood, such as oak, ash, or cherry, semi-charred for the purpose of decomposing the soluble salts of alumina produced during the electrolytical treatment in the manner hereinafter described.

The manner in which we carry our invention into effect in the treatment of whisky, or brandy, is as follows: The whisky or brandy is run into tanks, preferably of wood, and plates of aluminum constituting the electrodes of an electric circuit, are placed in said tank in contact with the liquor to be treated. The action of the electric current upon the whisky or brandy, when in contact with metallic aluminum electrodes, oxidizes the aldehydes in the liquor to the acid of the alcoholic series, which subsequently forms salts of alumina. The process of the formation of these salts may be briefly stated as follows: When the whiskies or brandies or the distillates of vinous fermentation are to be treated electrolytically with aluminum electrodes as aforesaid, the anode is attacked by the nascent oxygen, forming oxyhydrate of alumina, and at the same time a portion of the nascent oxygen oxidizes the aldehydes and alcohols into acids of their own series. The recently formed oxyhydrate of alumina then enters into combination with the acids (produced by the oxidation of the aldehydes and the alcohols) such as amylic, propylic, butylic, forming neutral and soluble salts. For instance, by oxidation of amylic alcohol or its aldehydes, valerianic acid is produced, which, in combination with the oxyhydrate of alumina forms a valerinate. The electrolytic treatment is continued until the offensive odor and taste of the mash of the new alcoholic distillate have disappeared, indicating that the whisky or brandy has been sufficiently treated with electricity, the alumina produced having neutralized or changed the noxious substances commonly known as fusel oils; but the electrolytic treatment must not be continued to excess, because some of the salts are resolved into other undesirable substances by the electric current, when the process is continued too long.

The next important step in the treatment of alcoholic distillates by this process, consists in the employment of certain kinds of wood, such for instance as oak, or cherry, by charring them to such an extent that a small amount of charcoal upon the exterior portions of the wood is produced. The wood however, is not charred sufficiently to break or destroy the texture or fiber, so that capillary action may take place through the longitudinal fibers, along their entire length, thus inducing certain decompositions hereinafter described. The charcoal produced by proper charring acts in conjunction with the uncharred portions of the wood.

The inside of the barrel intended to store the liquor, may be charred, provided the above conditions are adhered to; but good results are attained by placing sticks of wood partially charred, as before indicated, in a demijohn or bottle containing the liquor, and it is advisable to add such prepared sticks to the liquor in barrels.

A partial destructive distillation takes place during the charring of certain woods, producing pyroligneous acids which are retained in the wood. When this charred wood is introduced into alcoholic solutions which have been treated electrolytically, with aluminum electrodes (after the alcoholic liquor has been filtered, removing all substances in suspension) a preciptate of a flocculent appearance becomes visible after the lapse of a short time. The filtration does not remove the salts of oxyhydrate of alumina, with the acids of the alcohols, because they are soluble, and hence pass through the filter in the menstruum, and are acted upon by the pyroligneous acids of the wood, forming a precipitate which is an insoluble compound of alumina. After this precipitation, the acids of the alcohols are free to enter into combination with the alcohols of their own series, forming salts which are homologues of those produced by the storage of alcoholic liquors through a period of years.

The advantage over the present practice of storing whiskies from three to ten years in order to render them aged, ripened, or matured, is that the operation can be carried with certainty to completion while the common method of keeping whisky and brandy a long time in storage is only at best a matter of venture, as to time, to determine when the whisky or brandy is suitable for drinking purposes.

By our process whisky and brandy are rendered fit for consumption in nine or ten days; but if kept for one month or two they will be found to have all the properties of really old whiskies and brandies, now only obtainable after years of storing.

The quantity of current required to cure the spirits will depend upon the extent of active surface of the electrode; the electromotive force will depend upon the proof or strength of the spirits to be treated and the distance apart of the electrodes. The greater the proof or strength the greater the resistance to the current, and hence the greater the voltage required. We have found for example that with a proof whisky at a temperature of 86° Fahrenheit and twenty square feet of active electrode surface immersed in five and one-third cubic feet of liquor, the resistance was seventeen ohms, the electrodes being one and one quarter inches apart, and the electromotive force being fifty one volts.

In the treatment of wines before distillation to obtain pure brandies, the process is similar to that described. The wine having a much less resistance to the electric current than proof spirits, fewer volts are required, or the electrodes may be placed farther apart, care being taken not to use too great a current in order not to heat the wine, and thus cause loss by evaporation. The treatment should be carried on until the wine is chemically neutral, and the foreign matters have been precipitated. It is then run through filtering bags which retain the precipitates formed by this action, the clear wine being distilled in the usual way. It will be found that a large amount of the foreign matter will remain in the filters which leaves claret wine for instance, of a very much lighter color than it was before. The precipitates are then thrown into a centrifugal machine or the like, and drained of all the adhering liquor, and this liquor is distilled with the other. The residuum, being principally composed of tartrates, is treated for the purpose of rendering the tartrates marketable, the process of which treatment will form the subject matter of a separate application for a patent.

Our process is especially applicable to the treatment of wines for the production of pure brandy, as all the aldehydes are neutralized, and do not distill. The foreign matters having been eliminated by the electrolytic action and filtration, the wine is rendered chemically neutral before distillation, that is, neither alkaline nor acid. All traces of the offensive and earthy taste heretofore given to brandy will be eliminated, and at the same time the distillates of the wine are rendered easily acted upon by the specially prepared semi-charred wood as described.

A brandy distilled from wine which has been treated electrolytically as described, may be subjected to electrolytic action again in the same manner. Then the brandy may be aged, ripened or matured by the use of partially charred wood as previously described for the treatment of whisky. The brandy distilled from wine which has been electrolytically treated can be matured by the wood process without further use of the electric current. The brandy thus produced, even though from the poorest wines, has the properties of the best brandies in the market, and will be found superior in every way to most of them, because no foreign compounds are introduced, and the brandy only contains the products of the vinous fermentations of the wine.

The process is especially advantageous in the treatment of poor wines of little or no commercial value, and heretofore unfit for the production of brandy. It is also advantageous for the treatment of grape juice recently and quickly, but at the same time fully fermented, for by reason of the steps of subjecting the fermented product to electrolytic action, and then removing the foreign matters by filtration, brandy of the highest quality is produced.

Having thus described our invention, what we claim as new, and desire to secure by Letters Patent, is—

1. The treatment of alcoholic liquors, such as whiskies brandies and the like, which consists in subjecting them to the action of a current of electricity applied by means of electrodes of metallic aluminum retained in contact with the liquid under treatment, substantially as described.

2. The treatment of alcoholic liquors which consists in subjecting them to the action of a current of electricity applied through electrodes of metallic aluminum, and then retaining the liquors in contact with partially charred wood, substantially as described.

3. The treatment of wines or grape juice, which consists in subjecting the same after fermentation and before distillation, to the action of a current of electricity applied through electrodes of metallic aluminum, and then subjecting them, after distillation, to the action of partially charred wood, substantially as described.

4. The treatment of wines or grape juice, which consists in subjecting it to a current of electricity applied through electrodes of metallic aluminum, filtering, distilling the product, and retaining the distillate in contact with partially charred wood, substantially as described.

In testimony that we claim the foregoing as our invention we have signed our names, in presence of two witnesses, this 29th day of May, 1894.

ORAZIO LUGO.
HUSON T. JACKSON.

Witnesses:
GEO. LINN,
GEORGE E. STEWART.